US006204763B1

United States Patent
Sone

(10) Patent No.: US 6,204,763 B1
(45) Date of Patent: Mar. 20, 2001

(54) HOUSEHOLD CONSUMABLE ITEM AUTOMATIC REPLENISHMENT SYSTEM INCLUDING INTELLIGENT REFRIGERATOR

(75) Inventor: Masahiro Sone, Raleigh, NC (US)

(73) Assignee: Jujitsu Limited (JP)

( * ) Notice: Subject to any disclaimer, the term of this patent is extended or adjusted under 35 U.S.C. 154(b) by 0 days.

(21) Appl. No.: 09/274,429

(22) Filed: Mar. 22, 1999

(51) Int. Cl.$^7$ .................................................. G08B 13/14
(52) U.S. Cl. .................................. 340/568.1; 340/825.31; 232/19; 232/20; 232/21; 221/2; 235/281
(58) Field of Search .................................. 340/568.1, 585, 340/825.35; 221/2, 11, 6; 232/19, 20, 21, 1 A; 235/381

(56) References Cited

U.S. PATENT DOCUMENTS

| 1,175,947 | 3/1916 | Frederickson . | |
|---|---|---|---|
| 1,688,870 | 10/1928 | Leonard . | |
| 2,100,212 | 11/1937 | Ferrer | 232/1 |
| 2,128,854 | 8/1938 | Sagendorph et al. | 312/103 |
| 2,703,200 | 2/1955 | Burbank | 232/43.3 |
| 3,884,386 | 5/1975 | Urcola | 221/7 |
| 4,358,171 | 11/1982 | Christen | 312/286 |
| 4,629,090 | * 12/1986 | Harris et al. | 221/7 |
| 4,791,411 | * 12/1988 | Staar | 340/568 |
| 5,091,713 | 2/1992 | Horne et al. | 340/541 |
| 5,482,139 | * 1/1996 | Rivalto | 186/36 |
| 5,671,362 | 9/1997 | Cowe et al. | 395/228 |
| 5,711,160 | 1/1998 | Namisniak et al. | 62/125 |
| 5,774,053 | * 6/1998 | Porter | 340/568 |
| 5,979,750 | * 11/1999 | Kindell | 232/19 |
| 5,988,346 | * 11/1999 | Tedesco et al. | 194/217 |

\* cited by examiner

Primary Examiner—Daniel J. Wu
Assistant Examiner—Toan Pham
(74) Attorney, Agent, or Firm—Christie, Parker & Hale, LLP

(57) ABSTRACT

A household consumable item automatic replenishment system automatically maintains a desired inventory of household consumable items. The household consumable item automatic replenishment system has a refrigerator compartment having an indoor access and an outdoor access and an unrefrigerated compartment having an indoor access and an outdoor access. An automatic inventory system has a plurality of sensors configured to provide information representative of an inventory of the refrigerated compartment and the unrefrigerated compartment. An inventory processor is coupled to the sensors to process the information representative of the inventory of the refrigerated compartment and the unrefrigerated compartment, so as to make a list of items which are to be replenished. An automatic ordering system comprises a telecommunications device coupled to cooperate with the inventory processor to communicate at least a portion of the list to at least one vendor.

52 Claims, 2 Drawing Sheets

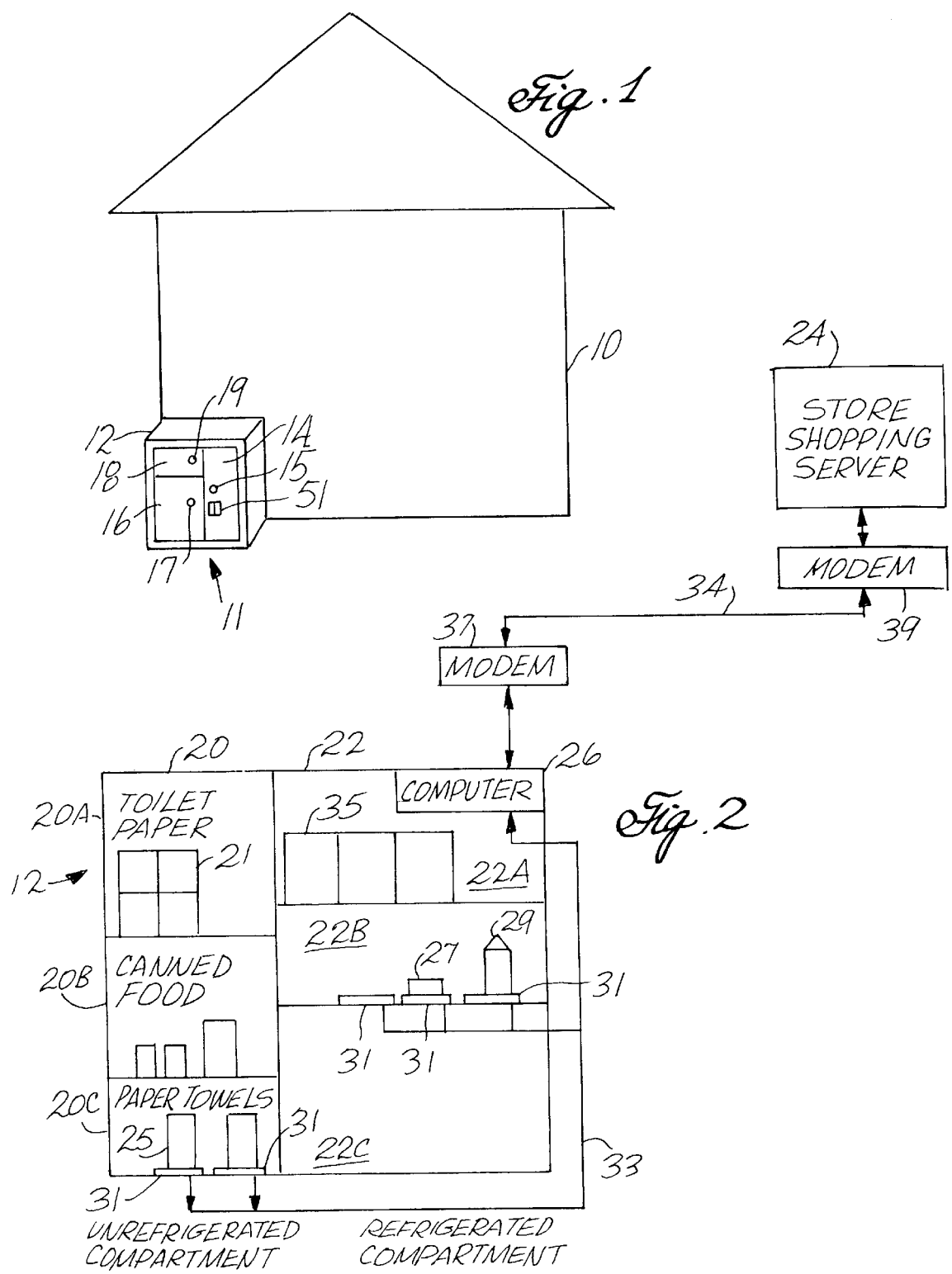

HOUSEHOLD CONSUMABLE ITEM AUTOMATIC REPLENISHMENT SYSTEM INCLUDING INTELLIGENT REFRIGERATOR

FIELD OF THE INVENTION

The present invention relates generally to automated inventory systems and relates more particularly to a household consumable item automatic replenishment system and method, including an intelligent refrigerator. The household consumable item automatic replenishment system automatically maintains a desired inventory of refrigerated and/or unrefrigerated household consumable items.

BACKGROUND OF THE INVENTION

Refrigerators for storing refrigerated consumable food items such as milk, butter and cheese, are well known. Cupboards for storing unrefrigerated consumable items, both food and non-food, are also well known. Typically, home refrigerators and cupboards are restocked by opening each, noting those items requiring replenishment, traveling to a store to purchase the necessary items, bringing the purchased items home and placing the purchased items in the refrigerator and/or cupboard.

However, this contemporary restocking process is extremely time consuming and requires substantial effort. It is well appreciated that people tend to value their time more highly now than in the past. This tendency to more highly value time nowadays is evidenced by a trend toward modern conveniences, frequently at the expense of financial considerations. For example, the increasing proliferation of convenience stores clearly indicates a desire to make purchases easily and quickly, even when the cost of such purchases is substantially higher than when the same purchases are made at a more distant supermarket. Thus, it is clear that people are becoming more willing to pay a premium for time saving conveniences.

In an effort to mitigate the inconvenience associated with purchasing household consumable items at retail stores, many consumers have turned to other means of shopping such as placing orders via the telephone, via fax, and/or via the Internet. While such telephone, fax, and Internet shopping is substantially more convenient than in-person shopping at a retail store, it still involves substantial time and inconvenience. A person must still determine which items are to be ordered, typically make a list of those items, and then place the telephone, fax or Internet order. Further, it will be appreciated that such telephone, fax, and/or Internet ordering typically occurs only after a person notices that particular item's need to be ordered. This typically occurs when such items are completely depleted from household inventory. Thus, such telephone, fax and/or Internet ordering frequently occurs at a much later point in time than is desirable. It would certainly be preferable to restock those items which are in short supply prior to completely depleting the supply thereof.

Automated inventory systems for facilitating the replenishment of goods, particularly at manufacturing and wholesale facilities, are also well known. Such automated inventory systems comprise sensors for detecting the presence of desired inventory items, and an inventory processor for facilitating restocking of those items whose stock level has fallen below a predetermined level.

It is also known to construct refrigerators and cupboards such that access thereto is provided at two different locations, such as on two opposite sides of a common wall. Such dual entry cupboards and refrigerators are frequently used at retail locations, wherein customers remove items to be purchased via a first access thereto which is located on the retail floor and service personnel, e.g., typically vendors and/or store employees, restock the cupboards and refrigerators from the second access thereto which is typically located within a stock room.

Although such dual access cupboards and refrigerators are common in commercial establishments, their benefits have not yet been fully appreciated in the home environment. Thus, it would be beneficial to provide dual access cupboards and/or refrigerators which are adapted for use in the home.

Additionally, one problem commonly associated with home refrigerators is that of undesirable perishable food spoilage. It is not unusual for perishable food items to be purchased and placed in a refrigerator, and then not be consumed entirely prior to spoilage thereof. Not only is such a practice wasteful, but it also may result in ruined meal plans, when necessary food items are not available.

In view of the foregoing, it is desirable to provide a household consumable item automatic replenishment system which facilitates the easy and convenient replacement of household consumable items as necessary to maintain a desired inventory thereof and which also facilitates the replacement of perishable food items prior to spoilage thereof.

SUMMARY OF THE INVENTION

The present invention specifically addresses and alleviates the above-mentioned deficiencies associated with the prior art. More particularly, the present invention comprises a household consumable item automatic replenishment system and method, including an intelligent refrigerator. The household consumable item automatic replenishment system automatically maintains a desired inventory of refrigerated and/or unrefrigerated household consumable items. The household consumable item automatic replenishment system has a refrigerated compartment having an indoor access through which consumable items are removed for use and having an outdoor access through which the refrigerated compartment is restocked. The household consumable item automatic replenishment system also has an unrefrigerated compartment having an indoor access through which consumable items are removed for use and having an outdoor access through which the unrefrigerated compartment is restocked. Easy restocking of both the refrigerated and unrefrigerated compartments by vendor or delivery personnel is facilitated as discussed in detail below.

An automated inventory system maintains a desired inventory of the household consumable items and comprises a plurality of sensors configured to provide information representative of an inventory of the refrigerated compartment and the unrefrigerated compartment. The sensors provide an indication of the presence and/or weight of desired household consumable items.

The automated inventory system further comprises an inventory processor coupled to the sensors for processing the information representative of the inventory of the refrigerated compartment and the unrefrigerated compartment, so as to make a list of those items which are to be replenished. Household consumable items may be replenished when either a quantity or weight thereof falls below a desired inventory level or threshold.

An automated ordering system comprises a telecommunications device which is coupled to cooperate with the inventory processor so as to communicate at least a portion of the list of items to be replenished made by the inventory processor to at least one vendor. In this manner, one or more vendors are notified of an order for those household consumable items which are necessary to maintain the desired inventory thereof. The vendor then either delivers or has delivered the required items.

According to the preferred embodiments of the present invention, at least one of the sensors comprises a weight sensor. The use of a weight sensor allows more precise control over inventory by measuring the quantity of partially consumed items remaining. For example, the weight of a carton of milk is representative of the amount of milk remaining in the carton and may thus be utilized to determine when milk should be reordered.

Thus, a predetermined threshold is utilized so as to determine when restocking of partially consumable item should occur. For example, for a gallon of milk the predetermined threshold may be specified as two pounds (approximately ¼ of a gallon). Thus, when the carton of milk is emptied to the point where it weighs two pounds or less, then milk is added to the list by the inventory processor. Optionally, such weight sensors may be used to similarly monitor the inventory of other items, such as canned goods and household supplies, e.g., paper towels, hand soaps, laundry detergent, etc., since the weight of the quantity of a particular item is clearly indicative of the quantity thereof. Thus, for example, the inventory processor may be configured to replenish chicken soup when the total weight of all cans of chicken soup falls below three pounds.

At least some of the sensors may comprise presence sensors, which provide a signal which is only indicative of the presence or absence of a particular consumable item. The use of presence sensors is particularly applicable in those instances wherein the consumable item is generally consumed in its entirety. For example, canned goods are typically utilized in their entirety (rather than having a portion thereof being utilized and the remaining portion returned to a cupboard for later use).

Such presence sensors may comprise on-off switches, pressure switches, laser beam switches, ultrasonic sensors, or any other type of sensor which provides a binary, i.e., on-off, output.

Alternatively, the sensors may be configured to sense an electronic or magnetic identification tag attached to each household consumable item, so as to facilitate the maintenance of an accurate inventory of household consumable items. As those skilled in the art will appreciate, various different electronic tags, transponders, or other identification means are suitable.

As a further alternative, delivery personnel may manually enter an identification for one or more of the household consumable items, during delivery thereof. This may be necessary, for example, when a new item is added to the household inventory.

The inventory processor preferably comprises a dedicated computer, which is built into a common cabinet, along with the refrigerated compartment and the unrefrigerated compartment. The inventory processor thus comprises a program which monitors the sensors, so as to determine the actual inventory of desired household consumable items. The actual inventory is compared to a desired inventory, and a list is made of those items which are part of the desired inventory, but are not present in the actual inventory.

Thus, the inventory processor is configured to add an item to the list when the weight of the item decreases to below a predetermined level, for each item which is placed upon a weight sensor. Similarly, the inventory processor is configured to add an item to the list for each absent item which is associated with a presence sensor.

Alternatively, the inventory processor comprises a personal computer which communicates with the sensors, preferably via an interface which is built into the cabinet. The interface performs any necessary signal conditioning and/or connectively, so as to provide an output which is compatible with the personal computer. Alternatively, the interface may be omitted and the personal computer configured to communicate directly with the sensors.

The telecommunications device preferably comprises a first modem which allows the computer to communicate with a store shopping server over ordinary telephone lines. A second modem typically facilitates communication of the store shopping server over the ordinary telephone lines. Optionally, the computer communicates with the store shopping server via an Internet connection. However, those skilled in the art will appreciate that various different types of communication between the computer and the store shopping server are likewise suitable. For example, a radio connection (via a radio modem, for example) may alternatively be utilized.

Further, the inventory processor is configured to add an item to the list after the item has been in either the refrigerated compartment or the unrefrigerated compartment for a predetermined length of time. In this manner, spoilage is mitigated by replacing perishable consumable items prior to spoilage thereof. Thus, a smart refrigerator is defined which mitigates food spoilage and/or maintains a desired inventory.

According to the preferred embodiment of the present invention, the outdoor access of the refrigerated compartment and the outdoor access of the unrefrigerated compartment comprise at least one lockable door. Preferably, either a key lock, a card key lock, or an electronic password lock is utilized to limit access to the refrigerated compartment and the unrefrigerated compartment. The outdoor access may be configured such that one lock limits access to all of the doors thereof. Alternatively, each door may comprise a dedicated, separate lock.

The present invention alternatively comprises a smart refrigerator which lacks both indoor and outdoor access thereto, but which utilizes one or more sensors to determine the length of time that a perishable consumable item has been stored therein, so that the perishable consumable item may be replaced prior to spoilage thereof, as discussed above. Optionally, such a smart refrigerator maintains a desired inventory of food items.

In any instance, the refrigerator optionally comprises a smart ordering terminal, whereby a person may modify a preexisting inventory processor generated replenishment list or may place an order entirely independent of the inventory processor. Thus, when a replenishment list is displayed upon a display of the refrigerator, for example, a person may add items to or delete items from the list, as desired. Further, the user may generate a separate order list, comprised of items which may not even be part of the normal household inventory, so as to effect automatic ordering of the desired items.

Further, the standard household inventory is preferably modifiable via either a touch screen display (preferably the display of the refrigerator itself) or via a personal computer.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a simplified schematic illustration of the outside of a house having a household consumable item automatic replenishment system according to the present invention;

FIG. 2 is a simplified schematic illustration of the interior of a cabinet having an unrefrigerated compartment, a refrigerated compartment and a built-in computer as viewed from an indoor access to the cabinet according to a first embodiment of the present invention wherein the built-in computer facilitates communication with a remotely located store shopping server;

DETAILED DESCRIPTION OF THE PREFERRED EMBODIMENT

The detailed description set forth below in connection with the appended drawings is intended as description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The household consumable item automatic replenishment system including intelligent refrigerator of the present invention is illustrated in FIGS. 1–4, which depict two presently preferred embodiments thereof.

Figure 3:
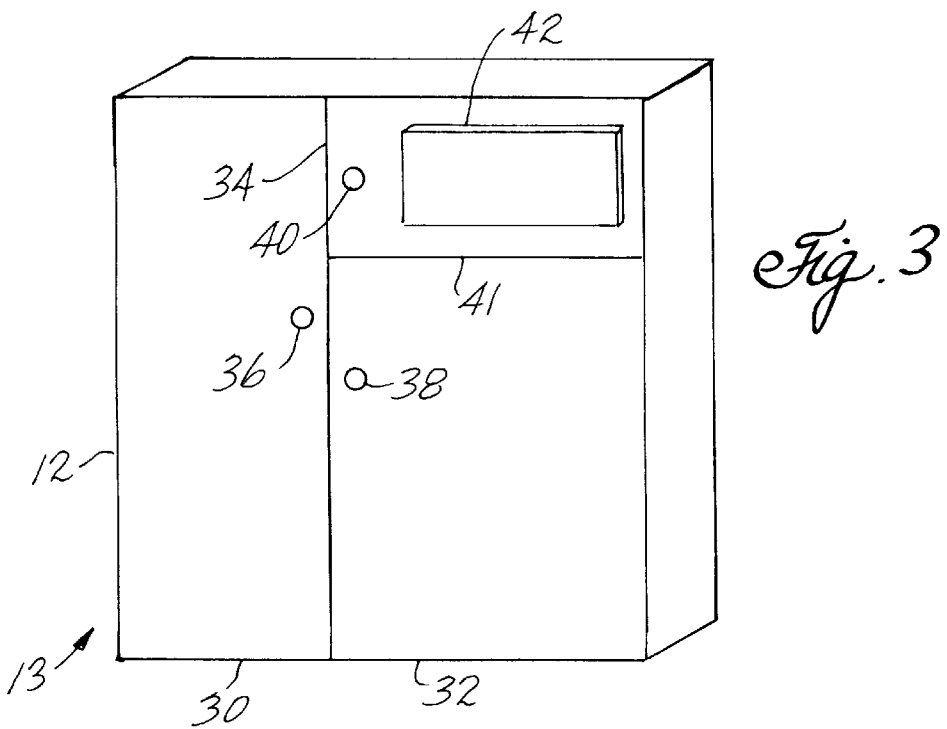
FIG. 3 is a simplified schematic illustration of the indoor portion of the cabinet of FIG. 2, having a dedicated display.

Referring now to FIGS. 1 and 3, the household consumable item automatic replenishment system, including intelligent refrigerator, of the present invention generally comprises a cabinet 12 which is constructed at least partially within a home 10 and configured so as to have an indoor access 13 (FIG. 3) and an outdoor access 11 (FIG. 1). The indoor access 13 facilitates removal of desired household consumable items therefrom, such that the items may be used. The outdoor access 11 facilitates restocking of the cabinet 12 with household consumable items. The cabinet 12 may be disposed mostly indoors, mostly outdoors, or so as to have any desired portion thereof indoors or outdoors. It is merely necessary that the indoor access 13 be indoors, so as to facilitate convenient access to consumable household items stored within the cabinet 12 and that the outdoor access 11 be readily accessible to a delivery person. Indeed, the outdoor access 11 may be located in a shed, garage, porch, or other enclosed area, if desired.

The outdoor access 11 of cabinet 12 comprises door 16, having handle 17, for facilitating access to second 22B and third 22C sections of refrigerated compartment 22 (FIGS. 2 and 4), a door 18 having handle 19 for facilitating access to first section 22A of refrigerated compartment 22 and a door 14 having handle 15 for facilitating access to unrefrigerated compartment 20. Lock 51, comprising either a key lock, a card key lock, an electronic password lock or the like limits access to the cabinet 12 via the outside access 11 to authorized personnel.

Referring now to FIG. 2, the interior of the cabinet 12 is shown as viewed from indoors. The unrefrigerated compartment 20 comprises separate sections 20A, 20B and 20C. Typically, foods not requiring refrigeration such as canned food 23 and consumable household items such as toilet paper 21 and paper towels 25 will be stored in the separate sections first 20A, second 20B and third 20C sections.

Similarly, refrigerated compartment 22 comprises separate first 22A, second 22B third and 22C sections. Preferably, first section 22A of the refrigerated compartment 22 comprises a freezer such that ice cream 35 and the like may be stored therein. Various refrigerated consumable food items such as butter 27 and milk 29 are stored in the second 22B and third 22C sections of the refrigerated compartment 22.

An automated inventory system comprises a built-in computer 26 and sensors 31 which detect the presence and/or weight of consumable household items placed thereon or associated therewith, so as to facilitate inventory processing, as described in detail below. According to the first embodiment of the present invention (shown in FIG. 2), the sensors 31 communicate with the dedicated, built-in computer 26 via wires 33, which preferably comprise a multi-connection cable such as a RS-485 cable. As those skilled in the art will appreciate, various different types of sensors are suitable. For example, pressure sensors, microswitches and/or laser sensors (laser/photodetector pairs) may be used to detect the presence of desired food items.

The sensors 31 alternatively comprise sensors for detecting electronic and/or magnetic tags, or transponders attached to each household consumable item and providing an identification thereof. Such electronic and/or magnetic transponders or tags preferably further provide an indication of the "born-on" date, i.e., the date on which the item was produced or manufactured, so as to facilitate freshness tracking by the inventory processor. In this manner, the inventory processor is notified of the age of the household consumable item, such that the household consumable item may be used or disposed of prior to expiration of the freshness thereof.

Alternatively, the initial date for freshness monitoring may be determined by the weight of the household consumable item. The household consumable item may be considered to be new when the full weight thereof is initially added to the cabinet. Thus, for example, when a full carton of milk is initially added to the refrigerated compartment of the cabinet, then the timer is started, so as to monitor freshness thereof until a predetermined expiration date, upon which the user is notified that the milk may not be fresh. Reordering of the milk is preferably performed prior to expiration of the freshness thereof.

The computer 26 facilitates inventory processing so as to make a list of those items requiring replenishment. The list of those items requiring replenishment is then communicated, via communications link 34, to a store shopping server 24, so that the items on the list may be replenished by store personnel or the like. The communications link 34 may comprise telephone lines, an Internet connection, a wireless connection, a network link or any other desired means of communication. Preferably, first 37 and second 39 modems facilitate communication between the computer 26 and the store shopping server 24 via ordinary telephone lines.

Thus, modem 37 facilitates communication by computer 26 over communications link 34 and similarly modem 39 facilitates communication of store shopping server 24 over communications link 34. The computer 26, taken together with the communications link 34 and/or the modem 37 comprise an automated ordering system.

With particular reference to FIG. 3, the indoor access 13 of cabinet 12 comprises door 30, having handle 36, for facilitating access to unrefrigerated compartment 20, door 41, having handle 40, for facilitating access to first section 22A of refrigerated compartment 22 and door 32, having handle 38, for facilitating access to the second 22B and third 22C sections of refrigerated compartment 22.

Optionally, a display 42 displays a list of the contents of the cabinet 12. The display 42 optionally further displays a list of those items requiring replenishment. The display 42 optionally further displays a list of items which are expected to need replenishment in the near future due to the quantities thereof nearing a predetermined threshold or due to the item's nearing a freshness expiration date thereof. The freshness expiration date of the item is also preferably displayed.

The display 42 preferably comprises an LCD display. However, those skilled in the art will appreciate that various other types of flat panel displays, e.g., LED, active matrix, dual scan etc., are likewise suitable.

It is important to appreciate that the physical configuration of the outdoor access 11 (as shown in FIG. 1) of the cabinet 12 need not conform in size, shape, and/or configuration to the physical configuration of the indoor access 13 (as shown in FIG. 3) of the cabinet 12. Thus, the outdoor access 11 of the cabinet 12 may be configured in any manner which is suitable for facilitating restocking of the refrigerated compartment 22 and the unrefrigerated compartment 20, while the indoor access 13 of the cabinet 12 may be configured in any manner which is suitable for the easy removal of items from the refrigerated compartment 22 and the unrefrigerated compartment 20.

Figure 4:
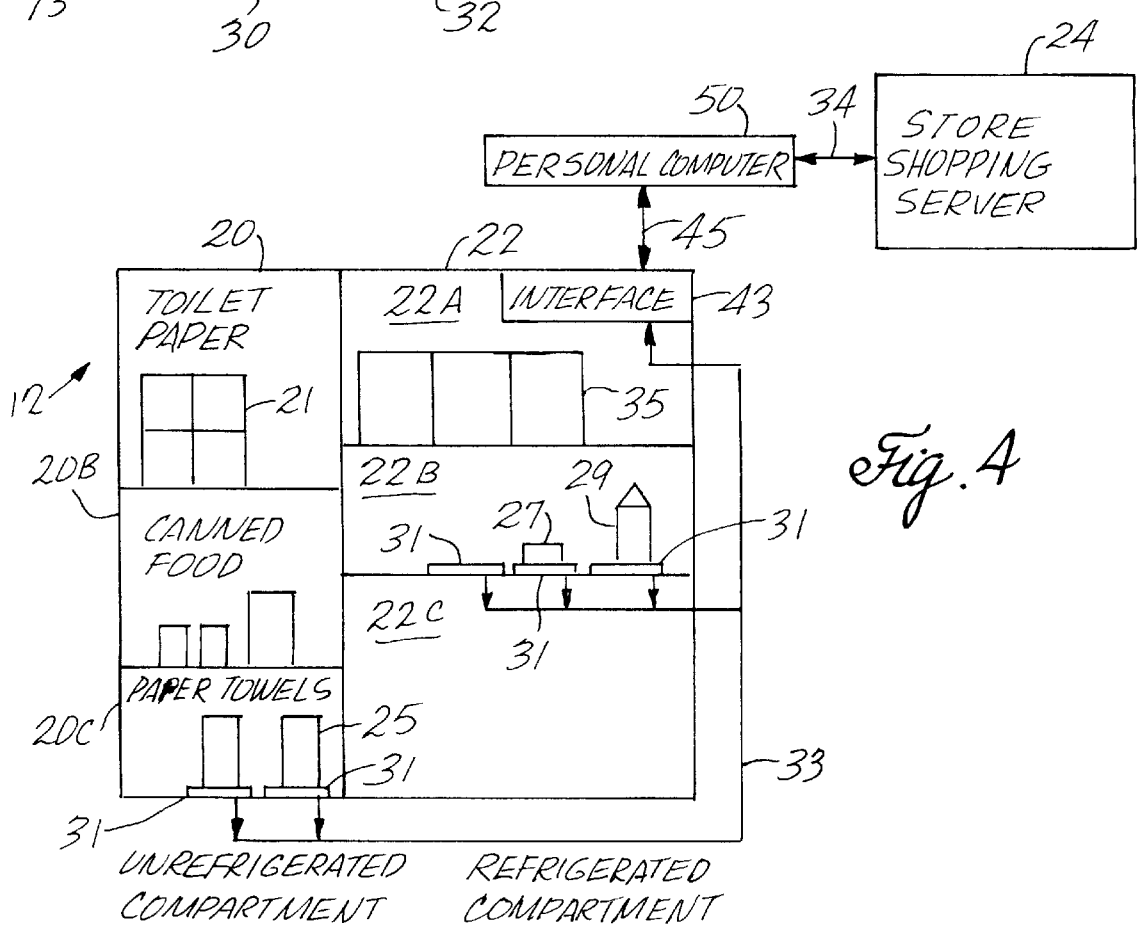
FIG. 4 is a simplified schematic illustration of the interior of a cabinet having an unrefrigerated compartment, a refrigerated compartment and a computer interface as viewed from an indoor access, according to a second embodiment of the present invention wherein a personal computer facilitates communication with a remotely located store shopping server.

Referring now to FIG. 4, the second preferred embodiment of the household consumable item automatic replenishment system, including intelligent refrigerator, is similar to the first embodiment thereof, except that instead of a dedicated, built-in computer, the second embodiment of the present invention comprises an interface 43 for facilitating communication between the sensors 31 and a personal computer 50, such as an IBM compatible personal computer or an Apple Macintosh, for example. The interface 43 is preferably coupled to the personal computer 50 via an IEEE-1394 cable, a RS-232 cable or the like. The interface 43 preforms any signal conditioning, routing, processing or connectivity functions which are necessary to make the sensors 31 compatible with the personal computer 50, according to well known principles. The personal computer 50 performs the inventory processing function and then transmits a list of items to be replenished via interface communication link 34 to the store shopping server 24 in the same manner that the dedicated, built-in computer 26 of the first embodiment of the present invention does.

Preferably, desired information such as present inventory, an order list, and a list of those items which will require ordering soon, are displayed upon the display 42 of the indoor access 13 as discussed above. However, these items, as well as in any additional desired information, may either additionally or alternatively be displayed upon a monitor of the personal computer 50.

The present invention may optionally comprise an intelligent refrigerator which does not necessarily include an unrefrigerated portion and which does not necessarily have both indoor and outdoor accesses thereto. Rather, the intelligent refrigerator comprises an inventory processor, such as that of built-in computer 26 or personal computer 50, which, in cooperation with sensors 31, provides an alert (either auditory or visual) that food items are about to spoil or have already spoiled, such as via either a built-in display 42 or a display of the personal computer 50. Optionally, automatic reordering of items which have spoiled or are about to spoil is facilitated via the inventory processor, as well. Further, automatic ordering of items whose inventory is below a desired level or threshold is also facilitated, as described above.

A menu system (facilitated by computer 26, 50) preferably allows the user to assign desired food items to specific sensors 31, and to set desired quantity or weight thresholds, as well as freshness expiration periods.

Having described the construction of the household consumable item automatic replenishment system, including an intelligent refrigerator, of the present invention, it may be beneficial to describe the use and operation thereof. In use, the unrefrigerated compartment 20 and the refrigerated compartment 22 are stocked with household consumable items, preferably via the outdoor access 11. Stocking is typically performed by a vendor or delivery person. Alternatively, the refrigerated compartment 20 and the refrigerated compartment 22 may be stocked via the indoor access 13. Preferably, the outdoor access must first be unlocked via lock 51, which preferably comprises either a key lock, a card key lock, an electronic password lock or the like, as discussed above.

According to the preferred embodiment of the present invention, each location within the unrefrigerated compartment 20 and the refrigerated compartment 22 is assigned to a particular household consumable item, such that the presence and/or weight of that particular household consumable item may be measured and/or monitored by the inventory processor of the computer 26, 50. Preferably, each location is labeled with the household consumable item to be placed thereat, so as to facilitate proper restocking. Optionally, a picture of the item may be placed at each location to aid in accurate restocking.

When an item triggers a presence sensor, the inventory processor updates the inventory list so as to indicate that the particular item no longer needs to be ordered. That is, the item is removed from the list of items which are to be replenished.

When a household consumable item is placed upon a weight sensor, the weight of the household consumable item is processed by the inventory processor, and if the weight is sufficient, the item is similarly then removed from the list of items to be replenished.

When a perishable household consumable item is placed at a location where storage time is monitored, then a clock for that particular location is reset to zero. The clock function is preferably performed by the computer 26,50. Preferably, the inventory processor can be configured to monitor storage time for any desired location. When the clock reaches a predetermined value for each location, an indication is provided to the user that the item should be removed from the cabinet 12 and discarded. Additionally, the item is placed upon the list of items to be ordered. This indication is preferably provided via the built-in display 42. Alternatively, the indication may be provided via a display of the personal computer 50. Optionally, an audible alarm sounds when a food item is to be discarded.

For example, milk may be assigned a storage duration of five days. When milk is first placed upon its associated weight sensor, the weight of the carton of milk is measured and milk is removed from the list of items to be ordered if the weight is above a predetermined threshold. Additionally, a clock for the milk is reset to zero. When the clock increments to indicate that five days have elapsed, then the user is notified, preferably via display 42, that the milk should be removed and discarded. Additional milk is preferably ordered in sufficient time to replace the old milk.

Alternatively, a vendor (rather than the user) may simply remove and discard the old carton of milk and replace it with a fresh carton, when the fresh carton is delivered.

Display 42 preferably shows an inventory of those items which are currently in the cabinet 12, as well as a list of those items which are currently being ordered. Optionally, the time remaining before perishable items are discarded may also be shown so as to facilitate more efficient meal planning in an attempt to mitigate undesirable waste. For example, if milk has been assigned a storage duration of five days, and the milk has been in the refrigerated compartment 22 for three days, then milk would be listed on the display 42 as having two days remaining before it should be discarded. In this manner, the user is notified that the milk must be consumed soon, or it will be wasted.

The display 42 optionally comprises a touch screen display which facilitates easy modification of the list of items to be replenished. A touch screen display also may be used to allow a person to place an order independent of the inventory processor. Thus, a person may place an order for items required for a specific meal, for example. Thus, according to the preferred embodiment of the present invention, the refrigerator further comprises an intelligent ordering terminal.

It is understood that the exemplary household consumable item automatic replenishment system, including intelligent refrigerator, described herein and shown in the drawings represents only a presently preferred embodiment of the invention. Indeed, various modifications and additions may be made to such embodiment without departing from the spirit and scope of the invention. For example, various different configurations of the cabinet 12 are contemplated. Thus, these and other modifications and additions may be obvious to those skilled in the art and may be implemented to adapt the present invention for use in a variety of different applications. Further, the inventory processor and the automated ordering system may alternatively be defined by the store shopping server 21.

What is claimed is:

1. A household consumable item automatic replenishment system for automatically maintaining a desired inventory of household consumable items, the household consumable item automatic replenishment system comprising:
   a refrigerated compartment having an indoor access through which consumable items are removed for use and having an outdoor access through which the refrigerated compartment is restocked;
   an unrefrigerated compartment having an indoor access through which consumable items are removed for use and having an outdoor access through which the unrefrigerated compartment is restocked;
   an automated inventory system comprising:
      a plurality of sensors configured to provide information representative of an inventory of the refrigerated compartment and the unrefrigerated compartment;
      an inventory processor coupled to the sensors for processing the information representative of the inventory of the refrigerated compartment and the unrefrigerated compartment so as to make a list of items which are to be replenished; and
   an automated ordering system comprising a telecommunications device coupled to cooperate with the inventory processor to communicate at least a portion of the list to at least one vendor.

2. The household consumable item automatic replenishment system of claim 1, wherein at least one of the sensors is a weight sensor.

3. The household consumable item automatic replenishment system of claim 1, wherein at least one of the sensors is a presence sensor.

4. The household consumable item automatic replenishment system of claim 1, wherein the inventory processor comprises a dedicated computer.

5. The household consumable item automatic replenishment system of claim 1, wherein the inventory processor comprises a signal processing device such as a personal computer, set-top-box or a purpose-built electronic entertainment apparatus.

6. The household consumable item automatic replenishment system of claim 1, wherein the telecommunications device comprises a modem.

7. The household consumable item automatic replenishment system of claim 1, wherein the telecommunications device is configured to communicate at least a portion of the list to at least one vendor via an Internet connection.

8. The household consumable item automatic replenishment system of claim 2, wherein the inventory processor is configured to add an item to the list when a weight of the item decreases to below a predetermined threshold.

9. The household consumable item automatic replenishment system of claim 1, wherein the inventory processor is configured to add an item to the list after the item has been in at least one of the refrigerated compartment and the unrefrigerated compartment for a predetermined length of time.

10. The household consumable item automatic replenishment system of claim 1, wherein the outdoor access of the refrigerated compartment and the outdoor access of the unrefrigerated compartment comprise at least one lockable door.

11. The household consumable item automatic replenishment system of claim 1, wherein the outdoor access of the refrigerated compartment and the outdoor access of the unrefrigerated compartment comprise at least one of a key lock, a card key lock and an electronic password lock configured to limit access to the refrigerated compartment and the unrefrigerated compartment.

12. A method for automatically maintaining a desired inventory of household consumable items, the method comprising the steps of:
   removing items from at least one of a refrigerated compartment and an unrefrigerated compartment via an indoor access thereof;
   sensing information representative of an inventory of the refrigerated compartment and the unrefrigerated compartment;
   processing information representative of the inventory of the refrigerated compartment and the unrefrigerated compartment so as to make a list of items which are to be replenished;

automatically communicating at least a portion of the list to at least one vendor to effect automatic ordering; and restocking at least one of the refrigerated and the unrefrigerated compartments via an outdoor access thereto.

13. The method as recited in claim 12, wherein the step of sensing information representative of an inventory of the refrigerated compartment and the unrefrigerated compartment comprises sensing a weight of at least one item.

14. The method as recited in claim 12, wherein the step of sensing information representative of an inventory of the refrigerated compartment and the unrefrigerated compartment comprises sensing a presence of at least one item.

15. The method as recited in claim 12, wherein the step of processing information representative of an inventory of the refrigerated compartment and the unrefrigerated compartment comprises processing the information with a dedicated computer.

16. The method as recited in claim 12, wherein the step of processing information representative of an inventory of the refrigerated compartment and the unrefrigerated compartment comprises processing the information with a signal processing device such as a personal computer, set-top-box or a purpose-built electronic entertainment apparatus.

17. The method as recited in claim 12, the step of automatically communicating at least a portion of the list to at least one vendor comprises communicating via a modem.

18. The method as recited in claim 12, the step of automatically communicating at least a portion of the list to at least one vendor comprises communicating via an Internet connection.

19. The method as recited in claim 12, wherein the step of processing information representative of the inventory of the refrigerated compartment and the unrefrigerated compartment so as to make a list of items which are to be replenished comprises adding at least one item to the list when a weight of the item decreases to a predetermined threshold.

20. The method as recited in claim 12, wherein the step of processing information representative of the inventory of the refrigerated compartment and the unrefrigerated compartment so as to make a list of items which are to be replenished comprises adding at least one item to the list when the item has been in at least one of the refrigerated compartment and the unrefrigerated compartment for a predetermined length of time.

21. The method as recited in claim 12, wherein the step of restocking at least one of the refrigerated and the unrefrigerated compartments via an outdoor access thereto comprises unlocking at least one door.

22. The method as recited in claim 12, wherein the step of restocking at least one of the refrigerated and the unrefrigerated compartments via an outdoor access thereto comprises unlocking at least one door via one of a key lock, a card key lock and an electronic password lock.

23. The method as recited in claim 12, wherein the step of making a list comprises comparing an actual inventory to a desired inventory.

24. An intelligent refrigerator comprising:
a refrigerated compartment for storing perishable food items;
an automated inventory system comprising:
a plurality of sensors configured to provide information representative of an inventory of the refrigerated compartment, at least one of the sensors further configured to trigger a start of a storage time in the refrigerated compartment; and an inventory processor coupled to the sensors for processing the information representative of the inventory of the refrigerated compartment so as to make a list of items which are to be replenished, the inventory processor being configured to add an item to the list after the item has been in the refrigerated compartment for a predetermined length of time.

25. The intelligent refrigerator of claim 24, wherein the refrigerated compartment comprises an indoor access through which consumable items are removed for use and an outdoor access through which the refrigerated compartment is restocked.

26. The intelligent refrigerator of claim 24, further comprising an automated ordering system comprising a telecommunications device coupled to cooperate with the inventory processor to communicate at least a portion of the list to at least one vendor.

27. The intelligent refrigerator of claim 26, wherein the telecommunications device comprises a modem.

28. The intelligent refrigerator of claim 26, wherein the telecommunications device is configured to communicate at least a portion of the list to at least one vendor via an Internet connection.

29. The intelligent refrigerator of claim 24, wherein at least one of the sensors is a weight sensor.

30. The intelligent refrigerator of claim 24, wherein at least one of the sensors is a presence sensor.

31. The intelligent refrigerator of claim 24, wherein the inventory processor comprises a dedicated computer.

32. The intelligent refrigerator of claim 24, wherein the inventory processor comprises a personal computer.

33. The intelligent refrigerator of claim 24, wherein the inventory processor is configured to add an item to the list when a weight of the item decreases to below a predetermined threshold.

34. The intelligent refrigerator of claim 24, wherein the inventory processor is configured to add an item to the list when a quantity of the item decreases to below a predetermined threshold.

35. The intelligent refrigerator of claim 24, wherein the outdoor access of the refrigerated compartment comprises at least one lockable door.

36. The intelligent refrigerator of claim 24, wherein the outdoor access of the refrigerated compartment comprises at least one of a key lock, a card key lock and an electronic password lock configured to limit access to the refrigerated compartment.

37. A method for automatically maintaining a desired inventory of consumable items in a refrigerator, the method comprising the steps of:
sensing information representative of an inventory of the refrigerator;
trigerring a start of storage time for the inventory of refrigerator; and
processing information representative of the inventory of refrigerator so as to make a list of items which are to be replenished, the inventory processor being configured to add an item to the list after the item has been in the refrigerator for a predetermined length of time.

38. The method as recited in claim 37, further comprising the step of displaying the list on a display proximate the refrigerator.

39. The method as recited in claim 37, further comprising the steps of removing consumable items from the refrigerator for use via an indoor access and restocking the refrigerator via an outdoor access.

40. The method as recited in claim 39, wherein the step of restocking the refrigerator via an outdoor access comprises unlocking a lockable door defining the outdoor access.

41. The method as recited in claim 39, wherein the step of restocking the refrigerator via an outdoor access comprises using at least one of a key lock, a card key lock and an electronic password lock to open the outdoor access.

42. The method as recited in claim 37, further comprising the step of automatically ordering at least some of the items on the list.

43. The method as recited in claim 37, further comprising the step of automatically ordering at least some of the items on the list via a telecommunications device coupled to an inventory processor of the refrigerator.

44. The method as recited in claim 37, further comprising the step of automatically ordering at least some of the items on the list via a modem.

45. The method as recited in claim 37, further comprising the step of automatically ordering at least some of the items on the list via an Internet connection.

46. The method as recited in claim 37, wherein the step of sensing information representative of an inventory of the refrigerator comprises sensing a presence of at least one item stored within the refrigerator.

47. The method as recited in claim 37, wherein the step of sensing information representative of an inventory of the refrigerator comprises sensing a weight of at least one item stored within the refrigerator.

48. The method as recited in claim 37, wherein the step of processing information representative of the inventory of the refrigerator comprises processing information with a dedicated computer.

49. The method as recited in claim 37, wherein the step of processing information representative of the inventory of the refrigerator comprises processing information with a personal computer.

50. The method as recited in claim 37, further comprising the step of adding an item to the list when a weight of the item decreases to below a predetermined threshold.

51. The method as recited in claim 37, further comprising the step of adding an item to the list when a quantity of the item decreases to below a predetermined threshold.

52. The method as recited in claim 37, wherein the step of making a list comprises comparing an actual inventory to a desired inventory.

* * * * *